(12) United States Patent
Subramanian et al.

(10) Patent No.: US 8,995,536 B2
(45) Date of Patent: Mar. 31, 2015

(54) SYSTEM AND METHOD FOR AUDIO/VIDEO SYNCHRONIZATION

(75) Inventors: Mk Subramanian, Bangalore (IN); Sandeep Bhatia, Bangalore (IN); Santosh Savekar, Bangalore (IN); Gaurav Aggarwal, Bangalore (IN); K. Shivapirakasan, Bangalore (IN)

(73) Assignee: Broadcom Corporation, Irvine, CA (US)

(*) Notice: Subject to any disclaimer, the term of this patent is extended or adjusted under 35 U.S.C. 154(b) by 2403 days.

(21) Appl. No.: 10/892,897

(22) Filed: Jul. 16, 2004

(65) Prior Publication Data

US 2005/0018775 A1    Jan. 27, 2005

Related U.S. Application Data

(60) Provisional application No. 60/489,558, filed on Jul. 23, 2003.

(51) Int. Cl.
| | | |
|---|---|---|
| *H04N 7/12* | (2006.01) | |
| *H04N 11/02* | (2006.01) | |
| *H04N 11/04* | (2006.01) | |
| *H04N 21/44* | (2011.01) | |
| *H04N 21/43* | (2011.01) | |

(52) U.S. Cl.
CPC ..... *H04N 21/44004* (2013.01); *H04N 21/4307* (2013.01)

USPC ............. 375/240.28; 375/240.25; 375/240.27

(58) Field of Classification Search
CPC ..................... H04N 21/44004; H04N 21/4307
USPC ............. 375/240.01–240.06, 240.12–240.16, 375/240.26–240.29
See application file for complete search history.

(56) References Cited

U.S. PATENT DOCUMENTS

| | | | | |
|---|---|---|---|---|
| 5,668,599 A | * | 9/1997 | Cheney et al. | 375/240.15 |
| 5,699,124 A | * | 12/1997 | Nuber et al. | 348/465 |
| 6,339,675 B1 | * | 1/2002 | Shimizu et al. | 386/98 |
| 6,519,283 B1 | * | 2/2003 | Cheney et al. | 375/240.01 |
| 6,674,803 B1 | * | 1/2004 | Kesselring | 375/240.26 |
| 6,906,755 B2 | * | 6/2005 | Lundblad et al. | 348/515 |
| 6,970,526 B2 | * | 11/2005 | Min | 375/354 |

* cited by examiner

*Primary Examiner* — Hee-Yong Kim
(74) *Attorney, Agent, or Firm* — Foley & Lardner LLP

(57) ABSTRACT

Described herein is a system and method for audio visual synchronization. The picture are displayed by receiving an identifier, said identifier associated with a frame buffer storing a picture; extracting a presentation time stamp associated with the picture, wherein the picture is associated with a time stamp; comparing a local time clock value to the presentation time stamp; determining that the picture is mature for presentation if the presentation time stamp exceeds the local time clock value by less than a first predetermined threshold; and determining that the picture is mature for presentation if the local time clock value exceeds the presentation time stamp by less than a second predetermined threshold.

24 Claims, 7 Drawing Sheets

SYSTEM AND METHOD FOR AUDIO/VIDEO SYNCHRONIZATION

RELATED APPLICATIONS

This application claims priority to Provisional Application for U.S. Patent Ser. No. 60/489,558, entitled "System, Method, and Apparatus for Display Management", filed Jul. 23, 2003, by Subramanian, et. al.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The playback process of MPEG-2 compressed video data includes determining the order and the times to display individual pictures. MPEG-2 is characterized by varying degrees of compression that take varying amounts of time to decode. Additionally, pursuant to MPEG-2, the data dependencies that are defined and permissible between pictures create situations where the pictures are decoded in a different order from the display order.

To assist with displaying the pictures at the correct times, the encoder writes a parameter known as the presentation time stamp, indicating the time that the picture is to be displayed. The foregoing works, provided that the vertical synchronization pulse is aligned with the start of frame. However, the timing of the vertical synchronization pulse is a function of the instant that the display device is powered on. Accordingly, the foregoing assumption cannot be assured.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Described herein is a system and method for audio visual synchronization.

In one embodiment, there is presented a method for displaying pictures. The method comprises receiving an identifier, said identifier associated with a frame buffer storing a picture; extracting a presentation time stamp associated with the picture, wherein the picture is associated with a time stamp; comparing a local time clock value to the presentation time stamp; determining that the picture is mature for presentation if the presentation time stamp exceeds the local time clock value by less than a first predetermined threshold; and determining that the picture is mature for presentation if the local time clock value exceeds the presentation time stamp by less than a second predetermined threshold.

In another embodiment, there is presented a system for displaying frames. The system comprises a buffer manager, a buffer descriptor structure, and a display manager. The buffer manager provides an identifier, said identifier associated with a frame buffer storing a picture. The buffer descriptor structure stores a presentation time stamp associated with the picture, wherein the picture is associated with a time stamp. The display manager compares a local time clock value to the presentation time stamp; determines that the picture is mature for presentation if the presentation time stamp exceeds the local time clock value by less than a first predetermined threshold; and determines that the picture is mature for presentation if the local time clock value exceeds the presentation time stamp by less than a second predetermined threshold.

In another embodiment, there is presented a circuit for displaying pictures. The circuit comprises a processor and an instruction memory connected to the processor. The instruction memory stores a plurality of instructions. Execution of the plurality of instructions by the processor causes receiving an identifier, said identifier associated with a frame buffer storing a picture; extracting a presentation time stamp associated with the picture, wherein the picture is associated with a time stamp; comparing a local time clock value to the presentation time stamp; determining that the picture is mature for presentation if the presentation time stamp exceeds the local time clock value by less than a first predetermined threshold; and determining that the picture is mature for presentation if the local time clock value exceeds the presentation time stamp by less than a second predetermined threshold.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1A:
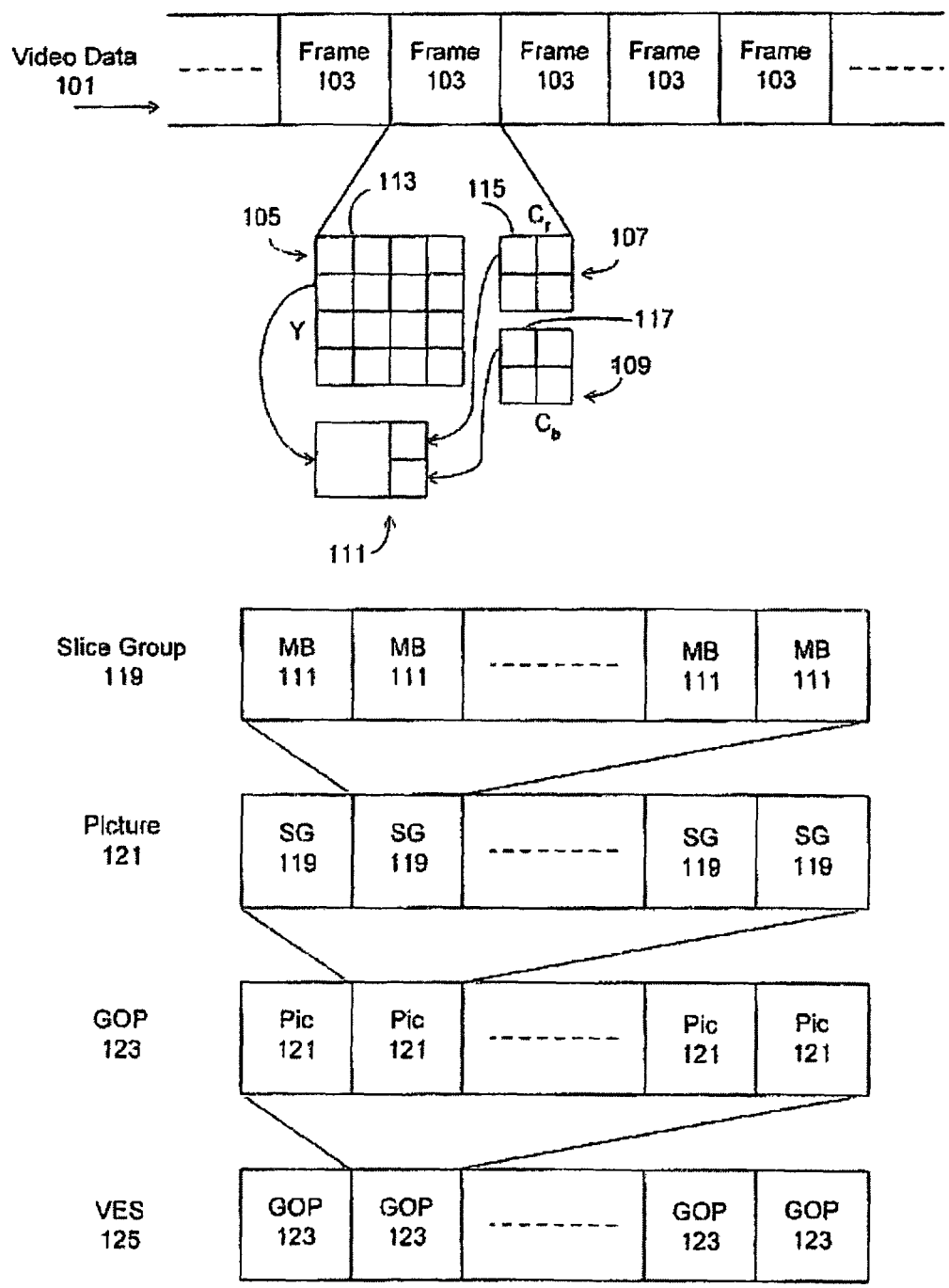
FIG. 1a illustrates a block diagram of an exemplary Moving Picture Experts Group (MPEG) encoding process, in accordance with an embodiment of the present invention.

FIG. 1a illustrates a block diagram of an exemplary Moving Picture Experts Group (MPEG) encoding process of video data 101, in accordance with an embodiment of the present invention. The video data 101 comprises a series of frames 103. Each frame 103 comprises two-dimensional grids of luminance Y, 105, chrominance red Cr, 107, and chrominance blue $C_b$, 109, pixels. The two-dimensional grids are divided into 8×8 blocks, where a group of four blocks or a 16×16 block 113 of luminance pixels Y is associated with a block 115 of chrominance red $C_r$, and a block 117 of chrominance blue $C_b$ pixels. The block 113 of luminance pixels Y, along with its corresponding block 115 of chrominance red pixels $C_r$, and block 117 of chrominance blue pixels $C_b$ form a data structure known as a macroblock 111. The macroblock 111 also includes additional parameters, including motion vectors, explained hereinafter. Each macroblock 111 represents image data in a 16×16 block area of the image.

The data in the macroblocks 111 is compressed in accordance with algorithms that take advantage of temporal and spatial redundancies. For example, in a motion picture, neighboring frames 103 usually have many similarities. Motion causes an increase in the differences between frames, the difference being between corresponding pixels of the frames, which necessitate utilizing large values for the transformation from one frame to another. The differences between the frames may be reduced using motion compensation, such that the transformation from frame to frame is minimized. The idea of motion compensation is based on the fact that when an object moves across a screen, the object may appear in different positions in different frames, but the object itself does not change substantially in appearance, in the sense that the pixels comprising the object have very close values, if not the same, regardless of their position within the frame. Measuring and recording the motion as a vector can reduce the picture differences. The vector can be used during decoding to shift a macroblock 111 of one frame to the appropriate part of another frame, thus creating movement of the object. Hence, instead of encoding the new value for each pixel, a block of pixels can be grouped, and the motion vector, which determines the position of that block of pixels in another frame, is encoded.

Accordingly, most of the macroblocks 111 are compared to portions of other frames 103 (reference frames). When an appropriate (most similar, i.e. containing the same object(s)) portion of a reference frame 103 is found, the differences between the portion of the reference frame 103 and the macroblock 111 are encoded. The location of the portion in the reference frame 103 is recorded as a motion vector. The encoded difference and the motion vector form part of the data structure encoding the macroblock 111. In the MPEG-2 standard, the macroblocks 111 from one frame 103 (a predicted frame) are limited to prediction from portions of no more than two reference frames 103. It is noted that frames 103 used as a reference frame for a predicted frame 103 can be a predicted frame 103 from another reference frame 103.

The macroblocks 111 representing a frame are grouped into different slice groups 119. The slice group 119 includes the macroblocks 111, as well as additional parameters describing the slice group. Each of the slice groups 119 forming the frame form the data portion of a picture structure 121. The picture 121 includes the slice groups 119 as well as additional parameters that further define the picture 121.

The parameters may include, for example, a presentation time stamp (PTS), decoding time stamp (DTS), a picture structure indicator (frame/top-field/bottom-field), a progressive picture sequence flag (usually comes in transport layer), a progressive frame flag, pan-scan vectors, an aspect ratio, a decode and display horizontal size parameter, a decode and display vertical size parameter, a top field first parameter, and a repeat first field parameter. It is noted that in varying standards there may be additional or less parameters.

Other parameters may also be functions of defined parameters. For example, the Still Picture Interpolation Mode (SPIM) is a function of the picture structure indicator and the progressive frame/progressive sequence flag. The SPIM represents the display interpolation mode to be used for a still picture and Personal Video Recording (PVR) application such as slow motion when real time decode is turned off. The SPIM controls the way a static frame picture can be displayed onto a screen, for example when a user wishes to pause on a certain frame or when the encoders encode the presentation time stamps of pictures in stream such that decoders are forced to display one frame repetitively. These actions can include displaying the last field, displaying the last displayed top and bottom field pair alternatively, and down-converting the entire frame lines to either top-field or bottom field. The amount of motion between two fields of a frame determines which SPIM mode gives the best visual quality.

Another example, the motion picture interpolation mode (MPIM) is also a function of the picture structure indicator, progressive frame flag, and progressive sequence flag. The MPIM is a one-bit value used while displaying moving pictures. If the bit is set, then a complete progressive frame is output onto the screen instead of breaking it into top and bottom fields. If the bit is reset, then the top or bottom field is sent depending on if the display hardware requires the top or the bottom field.

The progressive frame parameter indicates whether the picture has been encoded as a progressive frame. If the bit is set, the picture has been encoded as a progressive frame. If the bit is not set, the picture has been encoded as an interlaced frame.

The picture structure parameter specifies the picture structure corresponding to the image buffer. Pan scan vectors specify the displayable part of the picture. The aspect ratio indicates the aspect ratio of the image buffer. The decode and display horizontal size parameters indicate the decoded and the displayable horizontal sizes of the image buffer, respectively.

The top field first parameter is a one-bit parameter that indicates for an interlaced sequence whether the top field should be displayed first or the bottom field should be displayed first. When set, the top field is displayed first, while when cleared, the bottom field is displayed first.

The repeat first field is a one-bit parameter that specifies whether the first displayed field of the picture is to be redisplayed after the second field, for an interlaced sequence. For progressive sequence, the repeat first field forms a two-bit binary number along with the top field first parameter specifying the number of times that a progressive frame should be displayed.

Figure 1B:
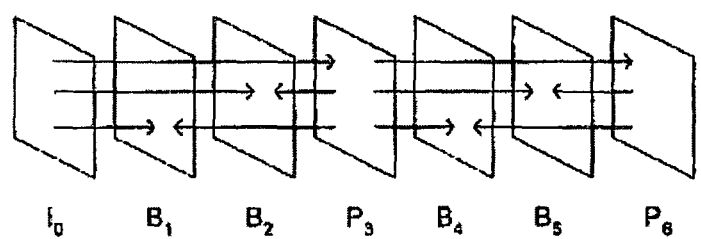
FIG. 1b illustrates an exemplary sequence of frames in display order, in accordance with an embodiment of the present invention.

$I_0$, $B_1$, $B_2$, $P_3$, $B_4$, $B_5$, and $P_6$, FIG. 1b, are exemplary pictures representing frames. The arrows illustrate the temporal prediction dependence of each picture. For example, picture $B_2$ is dependent on reference pictures $I_0$, and $P_3$. Pictures coded using temporal redundancy with respect to exclusively earlier pictures of the video sequence are known as predicted pictures (or P-pictures), for example picture $P_3$ is coded using reference picture $I_0$. Pictures coded using temporal redundancy with respect to earlier and/or later pictures of the video sequence are known as bi-directional pictures (or B-pictures), for example, pictures $B_1$ is coded using pictures $I_0$ and $P_3$. Pictures not coded using temporal redundancy are known as I-pictures, for example $I_0$. In the MPEG-2 standard, I-pictures and P-pictures are also referred to as reference pictures.

Figure 1C:
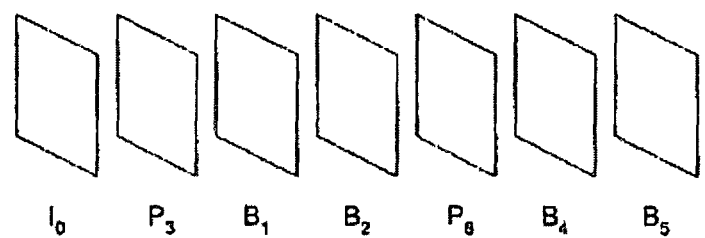
FIG. 1c illustrates an exemplary sequence of frames in decode order, in accordance with an embodiment of the present invention.

The foregoing data dependency among the pictures requires decoding of certain pictures prior to others. Additionally, the use of later pictures as reference pictures for previous pictures requires that the later picture be decoded prior to the previous picture. As a result, the pictures cannot be decoded in temporal display order, i.e. the pictures may be decoded in a different order than the order in which they will be displayed on the screen. Accordingly, the pictures are transmitted in data dependent order, and the decoder reorders the pictures for presentation after decoding. $I_0, P_3, B_1, B_2, P_6, B_4, B_5$, FIG. 1c, represent the pictures in data dependent and decoding order, different from the display order seen in FIG. 1b.

The pictures are then grouped together as a group of pictures (GOP) 123. The GOP 123 also includes additional parameters further describing the GOP. Groups of pictures 123 are then stored, forming what is known as a video elementary stream (VES) 125. The VES 125 is then packetized to form a packetized elementary sequence. Each packet is then associated with a transport header, forming what are known as transport packets.

The transport packets can be multiplexed with other transport packets carrying other content, such as another video elementary stream 125 or an audio elementary stream. The multiplexed transport packets form what is known as a transport stream. The transport stream is transmitted over a communication medium for decoding and displaying.

Figure 2:
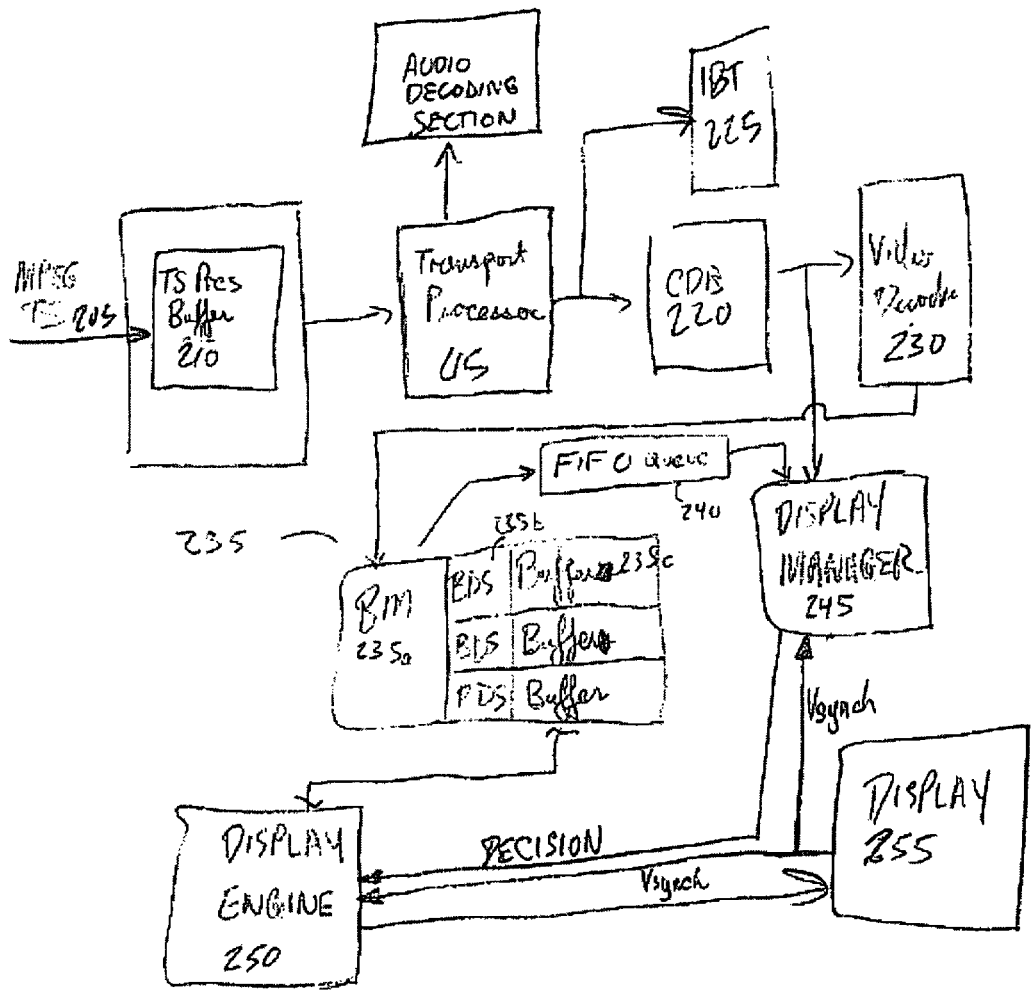
FIG. 2 is a block diagram of an exemplary decoder system in accordance with an embodiment of the present invention.

Referring now to FIG. 2, there is illustrated a block diagram describing an exemplary decoder system 200 in accordance with an embodiment of the present invention. The decoder system 200 receives an MPEG transport stream 205 and stores the transport stream 205 in a transport stream presentation buffer 210. The transport stream presentation buffer 210 can comprise memory, such as synchronous dynamic random access memory (SD-RAM).

A transport processor 215 demultiplexes the transport stream 205 into constituent elementary streams. For example the transport stream can comprise any number of video and audio elementary stream constituents. Additionally, the transport processor 215 parses and processes the transport header information from the transport streams stored in the transport stream presentation buffer 210. The constituent audio elementary streams can be provided to an audio decoding section of the decoder system 200.

The transport processor 215 writes video elementary stream 125 to a compressed data buffer 225. As noted above, the video elementary stream 125 comprises a hierarchy of various structures, such as GOPs 123, Pictures 121, slice groups 119, and macroblocks 111. The starting point of the foregoing is indicated in the video elementary stream 125 by what is known as a start code.

As the transport processor 215 writes the video elementary stream 125 to the compressed data buffer 225, the transport processor 215 also maintains an index table buffer 225. The index table buffer 225 comprises records of start codes and the address in the compressed data buffer 220 storing the start code. Additionally, the PTS and PCR_Offset are embedded in the index table buffer 225 with non-slice start code entries (start codes for entries at higher levels than the start code).

The video decoder 230 decompresses pictures 121 from the video elementary sequence 125. As noted above, pictures 121 can be encoded as offsets from other picture(s), including pictures 121 that are temporally earlier and later pictures in the display order. Additionally, the pictures 121 are also, not necessarily, decoded in the display order.

Accordingly, the video decoder 230 decodes reference pictures 121 prior to pictures that are predicted from the reference picture 121. After decoding a reference picture 121, the video decoder 230 applies offsets and displacements to the reference picture 121 as part of decoding another picture 121 that is predicted from the reference picture 121. However, in order to apply the offsets and displacements, the video decoder 230 stores decoded pictures 121 in a frame buffer system 235. Additionally, even pictures 121 that are not reference pictures 121 for other pictures 121, such as B pictures, are also stored in the frame buffer system 235 to await display.

The frame buffer system 235 comprises a buffer manager 235a, three or more buffer descriptor structures 235b, and three or more frame buffers 235c. Each buffer descriptor structure 235b corresponds to a particular one of the frame buffers 235c. The buffer descriptor structures 235b and frame buffers 235c can be implemented in dynamic random access memory (DRAM). The buffer manager 235a is a function or process executed by a processor that identifies and assigns a free buffer from the available pool of frame buffers 235c and corresponding buffer descriptor structures 235b for every picture 121 that comes for decoding. The buffer manager 235a and the buffer descriptor structure 235b and frame buffers 235c are drawn together for ease of understanding. Additionally, the frame buffer system 235 can also be configured for storage of interlaced pictures 121. In such as a case, the frame buffers 235c store both fields making up the picture 121.

When the video decoder 230 receives a picture 121 from the compressed data buffer 220, the corresponding index buffer table 225 entry associated with the picture 121 is also extracted and parsed. If a PTS and/or DTS is present, it is parsed out from the index buffer table 225 and associated with the next picture 121 arriving after this point. Similarly PCR offset is also extracted from the index buffer table 225. As the video decoder 230 decodes pictures 121, the video decoder 230 writes the picture 121 into a buffer descriptor structure 235b and the associated PTS and PCR_Offset into a corresponding frame buffer 235c.

Additionally, the buffer manager 235a pushes a buffer identifier into a First-In-First-Out (FIFO) Queue 240. When the pictures 121 are decoded and stored in the buffer system 235, a display manager 245 determines the appropriate picture 121 for display on a display device 255. The display device 255 displays pictures 121 at highly very specific time intervals. The display device 255 synchronizes the display system 200 to the display device 255 by use of a vertical synchronization pulse Vsynch.

The display manager 245 is driven by the vertical synchronization pulse Vsynch, in an interrupt drive manner. At the vertical synchronization pulse, Vsynch, the display manager 245 examines the contents of the FIFO queue 240 to determine the appropriate picture for display. The display manager 245 provides the determination to a display engine 250. The display engine 250 provides the picture 121 determined by the display manager 250 from the frame buffer 235c to the display device 255.

Time Stamp Management

The display manager 245 primarily does the time stamp management, although the video decoder 230 can also do a portion, as well.

Video Decoder Time Stamp Management

The video decoder 230 can compare the PTS value of every B-picture 121 (note that the PTS and DTS values of B pictures are the same) provided for decoding to the current STC value. If the PTS value and the STC value differ by more than a predetermined threshold, the video decoder 230 drops the B-picture 121 without decoding.

This is advantageous because B-pictures 121 because the PTS and the STC differing by more than a certain threshold is indicative that the B-picture has arrived prematurely and will not be selected by the display manager 250 at the current time. Additionally, the B-pictures 121 are not needed as reference pictures 121 for other pictures 121. Accordingly, dropping or otherwise not decoding the B-picture, where the PTS and STC differ by more than a certain threshold, preserves the resources of the video decoder 230 and the buffer system 235.

Figure 3:
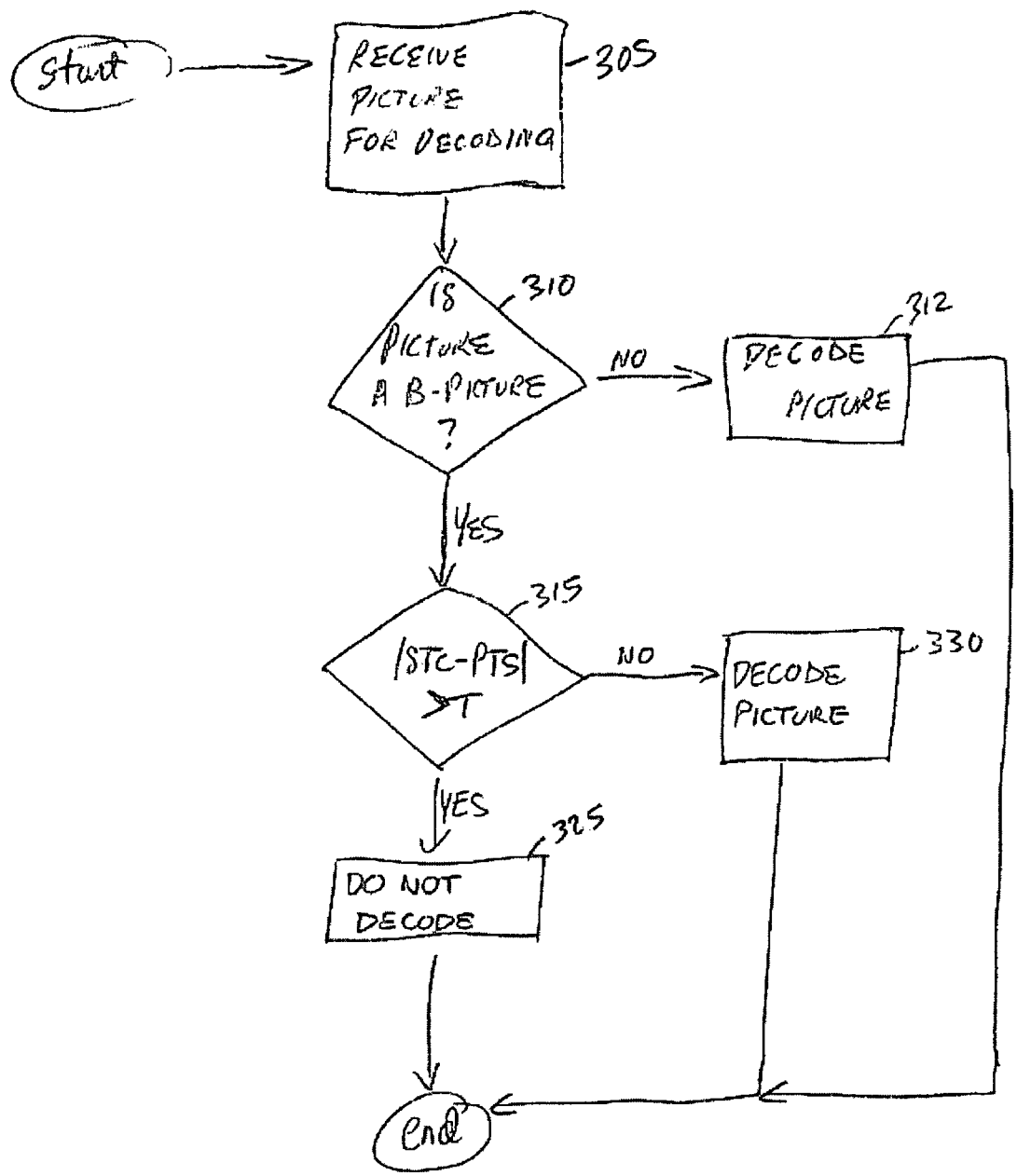
FIG. 3 is a flow diagram describing the operation of the video decoder in accordance with an embodiment of the present invention.

Referring now to FIG. 3, there is illustrated a flow diagram describing the operation of the video decoder 230 in accordance with an embodiment of the present invention. At 305, the video decoder 230 receives a picture 121 for decoding. At 310, the video decoder 230 determines whether the picture 121 is a B-picture. The foregoing determination can be made by examining the parameters associated with the picture 121, as well as by examining the parameters stored in the index buffer table 225.

If at 310, the video decoder 230 determines that the picture 121 received during 305 is not a B-picture 121, the video decoder 230 decodes (312) the picture 121. If at 315, the video decoder 230 determines that the picture 121 received during 305 is a B-picture 121, the video decoder 230 compares the PTS associated with the B-picture 121 with the STC value at 320.

If the STC value and the PTS differ by more than a predetermined threshold, the B-picture 121 is premature for decoding and unlikely to be selected by the display manager 245 for displaying. Accordingly, where the STC value and the PTS differ by more than a predetermined threshold, the B-picture 121 dropped and not decoded at 325. If the STC value and the PTS differ by less than a predetermined threshold, the B-picture 121 is sufficiently likely to be selected for display by the display manager 245, and is decoded at 330.

Time Stamp Management at the Display Manager

Referring again to FIG. 2, as noted above, as the buffer manager 235a identifies and assigns frame buffers 235c and buffer descriptor structures 235b, the buffer manager 235a pushes entries into the FIFO queue 240 for the display manager's consideration for display in subsequent Vsynchs.

The entries in the FIFO queue 240 are essentially a buffer index. For example, when a stream with a progressive_sequence=1 is getting decoded, all the entries in the display FIFO 240 will correspond to frames. Where there are three frame buffers 235c, the entries can take values between 0 and 5. Where there are four frame buffers 235c, the entries can take values between 0 and 7.

Elements are derived from entries based on the display characteristics. Any multiple, duplicate displays (for example, because of source frame rate being different from display frame rate) happen at element level. For example, in an interlaced display, when a stream with progressive_sequence=0 is getting decoded, the entries will either be frames or field buffers, while, all elements will be field for one of the "frame" entries, then, there will be three elements corresponding to this entry and one of the (repeated) elements is called a trivial element. Where there are three frame buffers 235c, the entries can take values between 0 and 5. Where there are four frame buffers 235c, the entries can take values between 0 and 7.

Figure 4:
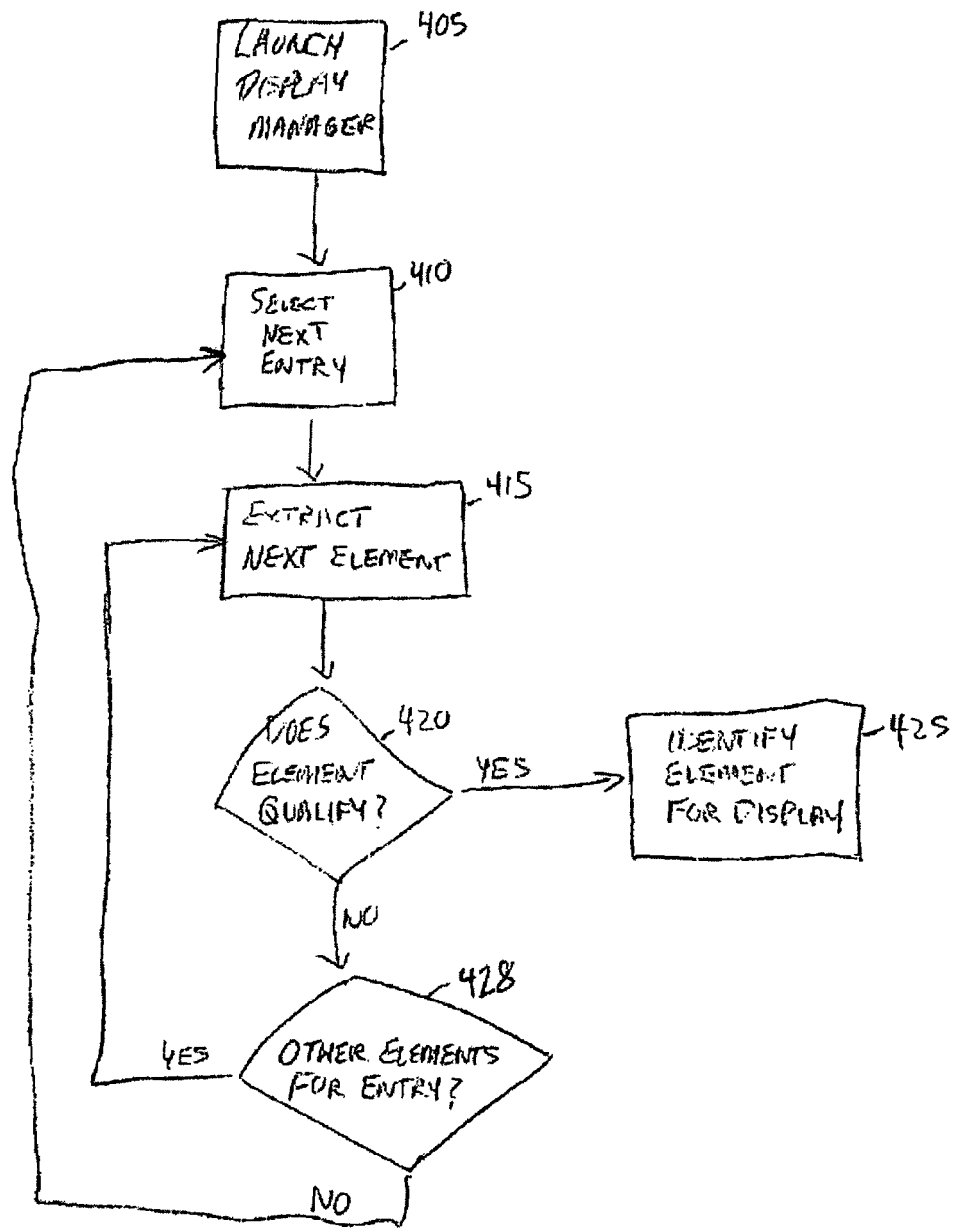
FIG. 4 is a flow diagram describing the operation of the display manager in accordance with an embodiment of the present invention.

Referring now to FIG. 4 there is illustrated a flow diagram describing the operation of the display manager in accordance with an embodiment of the present invention. The Vsynch signal launches the display manager 245 (at 405). Responsive thereto, the display manager 245 selects (410) the topmost entry in the FIFO queue 240, and extracts (415) the first element out of that entry and inspects various parameters like the PTS, PCR_offset, corresponding to that element and extraneous parameters like the STC value, and parity of the Vsynch. The display manager 245 tests and compares and determines (420) whether the just considered element qualifies for display following the Vsynch or not.

If the element qualifies for display, the display manager 245 identifies the element to the display engine 250 for display on the display 255 at 425. If the element does not qualify for display, then the next element of the just extracted entry is selected (415) for display for the Vsynch. If all of the elements of an entry have been considered (at 428), then the next entry (410) in the display FIFO queue 240 is considered.

The display manager 245 maintains a running Presentation Time Stamp (PTS) register. This register forms the basis of PTS, SCR comparisons for the qualification of a frame/field for display. If an frame or field does not have an associated coded PTS, the PTS value for that element is computed as shown below and used for the doing the TSM for that element.

$$\text{Running PTS Value} = \text{Previous Running PTS Value} + \text{Delta PTS} \qquad (1)$$

Where,

PTS is a function of values of input frame_rate and progressive_sequence flags.

If a progressive sequence (progressive_sequence parameter=1), then:

Delta PTS=1/(Input Source frame rate) on 45 KHz clock.
else (i.e. progressive_sequence=0),
Delta PTS=1/(2*Input Source frame rate) on 45 KHz clock.

This register forms the basis of PTS vs. SCR comparisons for pictures that do not have a value for the PTS provided by the encoder. If a picture which has PTS provided by encoder for it, then, that PTS value is used to overwrite this register. The instances at which PTS is added to an element, when coded PTS hasn't occurred in the stream also varies depending on the progressive_sequence flag of the stream as explained below. The principle that has been applied while identifying the instances at which PTS is to be added, is to exactly duplicate the scenario where all the pictures have coded PTS. Interpolation of PTS by adding PTS should result in a new PTS value that is same as what would have come if coded PTS existed.

When progressive_sequence=1, (assuming source frame rate=display frame rate), an entry will get displayed over two Vsyncs, as two elements: top and bottom field. Since all entries will be frame, a new coded PTS that can come for each entry and can "most often" occur at a frame level. What this means is that in a stream with progressive_sequence=1, if all the pictures in this stream (which are the entries and will be frames) have coded PTS then, the highest frequency in which PTS could occur in the stream is at one frame distance and the difference in the PTS value between two successive coded PTS will be=1/(Input Source frame rate) on 45 KHz clock which is what PTS by definition. Replicating the same condition when using PTS, a new PTS value for an entry (frame) is calculated when the entry doesn't have a coded PTS associated with it, using the formula given in (1) above. The same PTS value is used for all the elements (including the trivial elements) derived from the "parent" entry, in this case.

When progressive_sequence=0, an entry, (assuming source frame rate=display frame rate), may get displayed either over three Vsyncs, two Vsyncs or one Vsync, depending on the values of the progressive_frame and repeat_first_flag flags. Considering all the above cases, the least "unit" an entry could occur in the display FIFO is a field and a new coded PTS which can come for each entry, can "most often" occur at a field level. What this means is that in a stream with progressive_sequence=0, if all the pictures in this stream (which are the entries and could be either frame or fields) has coded PTS then, the least frequency in which PTS could occur in the stream is at one field distance and the difference in the PTS value between two successive coded PTS will be=1/(2*Input Source frame rate) on 45 KHz clock. This is value that is used for PTS. Replicating the same condition when using PTS, a new PTS value for every element of an entry (either frame or field) is calculated when the entry doesn't have a coded PTS associated with it, using the formula given in (1) above. The same PTS value is used for all the trivial elements too, in this case.

Figure 5:
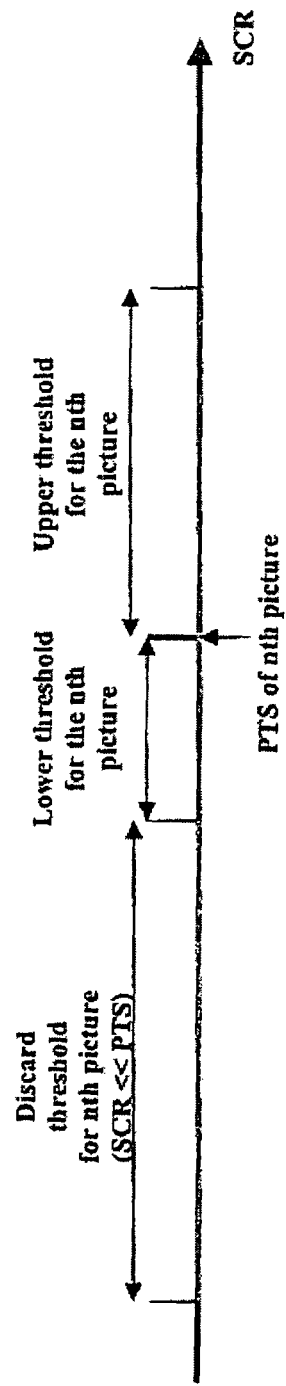
FIG. 5 is a timing diagram between the presentation time stamp and the system clock reference.

Referring now to FIG. 5, there is illustrated a chart comparing the SCR with the PTS for a particular picture or field. The SCR increases from left to right. The PTS is constant and the point in the range of SCR values that is equal to the PTS is indicated.

Three ranges are defined—(1) the upper threshold, (2) the lower threshold, and (3) the discard threshold. The upper threshold is the range of SCR values that exceed the PTS of the picture by no more than a predetermined threshold. The lower threshold is the range of SCR values that are exceeded by the PTS of the picture by no more than another predetermined threshold. The discard threshold is the range of SCR values that are exceeded by at least the another threshold, but by less than a third threshold.

When a picture is examined, and the SCR value is within the lower threshold or upper threshold, with respect to the PTS associated with the picture, the picture passes the time stamp management criteria. When the SCR value is within the discard threshold with respect to the PTS value, it is likely that the picture was decoded prematurely but will mature in the next few Vsynchs. Accordingly, the buffer entry/element left in the FIFO queue 240.

However, there are circumstances wherein the SCR value falling within the discard threshold of the picture with respect to the PTS is indicative of a corrupted or erroneous PTS. Accordingly, the discard threshold can be disabled. Where the discard threshold is disabled, and when a picture is examined the SCR value is within the discard threshold with respect to the PTS value, the picture is handled as if the SCR did not fall in any of the three defined ranges. When a picture is examined, and the SCR value does not fall within any of the defined ranges, the picture is dropped without display. The course of actions for different TSM results are described in Table 1.

TABLE 1

For Progressive Frames

| TSM Result | Future Course of action |
|---|---|
| Pass | Display the current entry. |
| Fail | Consider next element. (Next element = either the "other" field of this same frame entry, if this entry has been frame coded and we just now considered the "first of the two fields of the frame" or the next entry in the FIFO if this entry is a field or just now considered the "second field" of a frame). |
| Wait | Check TSMWait.CTOS bit |

TSM:
Pass - SCR within Upper Threshold or Lower Threshold
Wait - SCR within Discard Threshold, Discard Threshold Enabled
Fail - SCR outside of Upper Threshold, Lower Threshold, and Discard Threshold, or within Discard Threshold with Discard Threshold Disabled Parity Check However, in the case of interlaced pictures, parity is an issue. Parity check is when the display is interlaced. Parity check ensures that the polarity of the picture (field picture) matches the Vsynch polarity (interlaced display). In parity check, the current Vsync's parity and the parity of the "current element" (whether the current element is a field extracted from a frame or a field element itself) are compared. A pass in parity check=> the parity of the current element and the parity of current Vsynch are one and the same. A fail=> the parity of the current element and the parity of current Vsynch are different.

The following example illustrates a situation that can occur if a picture that has passed TM but has failed parity is never discarded.
In the following example:
(1) All entries=elements.
(2) xxxx=don't care except for the condition in the brackets.
(3) Upper Threshold=2*delta threshold=>(under entry=element case) any entry will have TSMResult=TSM_PASS on two consecutive Vsyncs.
(4) An element is not discarded if the element fails Parity check but TSMResult=TSM_PASS, but wait till the next Vsynch to display it.

| Vsynch index | Action of display manager |
|---|---|
| 0th Vsync | Display FIFO depth = 0, Can do nothing. |
| 1st Vsync | Display FIFO depth = xxxx (>0) |
| | TSMResult of 0th entry(=element) = TSM_PASS |
| | ParityResult = PARITY_FAIL (Would have passed if it is in 0th Vsynch or in 2nd Vsync) |
| | Action: Don't discard the just considered (0th) entry/element & wait. |
| 2nd Vsync | Display FIFO depth = xxxx (>1) |
| | TSMResult of 0th entry(=element) = TSM_FAIL. |
| | ParityResult = PARITY_PASS. |
| | Action: Discard the just considered (0th) entry/element. Consider the next entry in the display FIFO. |
| | Display FIFO depth = xxxx (>0) |
| | TSMResult of 1st entry (=element) = TSM PASS. |
| | ParityResult = PARITY_FAIL (Would have passed if come up in 1st Vsynch or in 3rd Vsync.) |
| | Action: Don't discard the just considered (1st) entry/element & wait. |
| 3rd Vsync | Display FIFO depth = xxxx (>1) |
| | TSMResult of 1st entry (=element) = TSM_FAIL |
| | ParityResult = PARITY_PASS. |
| | Action: Discard the just considered (1st) entry/element. Consider the next entry in the display FIFO. |
| | Display FIFO depth = xxxx (>0) |
| | TSMResult of 2nd entry (=element) = TSM_PASS. |
| | ParityResult = PARITY_FAIL (Would have passed if come up in 2nd Vsynch or in 4th Vsync.) |
| | Action: Don't discard the just considered (1st) entry/element & wait. |

Because of decision not to discard any element which passed TSM but fails parity check, there is no Vsynch where an element has both TSMResult=TSM_PASS as well as ParityCheckResult=PARITY_PASS. This results in a deadlock situation. Also, it is noted that all the elements are in the SECOND_VSYNC_SLOT when they pass TSM. Thus, the deadlock can continue without resolution.

The following example illustrates a situation that can occur if a picture that has passed TM but has failed parity is discarded, but the decoder waits until the next vsynch to display it.
In the following example:
(1) All entries=elements.
(2) xxxx=don't care except for the condition in the brackets.
(3) Upper Threshold=2*delta threshold=>(under entry=element case) any entry will have TSMResult=TSM_PASS on two consecutive Vsyncs.
(4) if the element fails Parity check but TSMResult=TSM_PASS, always discard, but wait till the next Vsynch to display it.

| Vsynch index | Action of display manager |
|---|---|
| 0th Vsync | Display FIFO depth = xxxx (>1)<br>TSMResult of 0th entry(=element) = TSM_PASS<br>ParityResult = PARITY_FAIL (Would have passed if it is in $1^{st}$ Vsynch or in $3^{rd}$ Vsync)<br>Action: Discard the just considered entry/element. Consider the next entry in the display FIFO.<br>Display FIFO depth = xxxx (>0)<br>TSMResult of 1st entry (=element) = TSM_WAIT.<br>ParityResult = PARITY_PASS<br>Action: Don't discard the just considered (1st) entry/element & wait. |
| 1st Vsync | Display FIFO depth = xxxx (>1)<br>TSMResult of $1^{st}$ entry(=element) = TSM_PASS.<br>ParityResult = PARITY_FAIL. (Would have passed if it is in $0^{th}$ Vsynch or in $2^{nd}$ Vsync)<br>Action: Discard the just considered entry/element. Consider the next entry in the display FIFO.<br>Display FIFO depth = xxxx (>0)<br>TSMResult of 1st entry (=element) = TSM_WAIT.<br>ParityResult = PARITY_PASS<br>Action: Don't discard the just considered (1st) entry/element & wait. |
| 2nd Vsync | Display FIFO depth = xxxx (>1)<br>TSMResult of 0th entry (=element) = TSM_PASS.<br>ParityResult = PARITY_FAIL. (Would have passed if come up in $1^{st}$ Vsynch or in $3^{rd}$ Vsync.)<br>Action: Discard the just considered entry/element. Consider the next entry in the display FIFO.<br>Display FIFO depth = xxxx (>0)<br>TSMResult of 1st entry (=element) = TSM_WAIT.<br>ParityResult = PARITY_PASS<br>Action: Don't discard the just considered (1st) entry/element & wait. |
| 3rd Vsync | Display FIFO depth = xxxx (>1)<br>TSMResult of 1st entry(=element) = TSM_PASS<br>ParityResult = PARITY_FAIL. (Would have passed if come up in $2^{nd}$ Vsynch or in $4^{th}$ Vsync.)<br>Action: Discard the just considered (entry/element. Consider the next entry in the display FIFO.<br>Display FIFO depth = xxxx (>0)<br>TSMResult of 2nd entry (=element) = TSM_WAIT.<br>ParityResult = PARITY_PASS<br>Action: Don't discard the just considered ($1^{st}$) entry/element & wait. |

Because of the decision not to discard any element which passed TSM but fails parity check, there are no Vsynch where an element has both TSMResult=TSM_PASS as well as ParityCheckResult=PARITY_PASS. This will result in a deadlock situation. It is also noted that all the elements are in the FIRST_VSYNC_SLOT when they pass TSM. Thus the deadlock situation will not resolve.

If an element has TSMResult=TSM_PASS and ParityCheckResult=PARITY_FAILED, then increasing the upper threshold to a value larger than 2 Vsyncs will not mitigate the problem of infinite, alternate "TSM pass, parity fail" and "TSM fail, Parity pass" for all the elements in the stream. In general, if there is an 'n' Vsynch upper threshold window, and if there is a TSM pass and parity fail for a picture, then the video decoder's action should be different depending on whether the picture passed TSM by falling in the lower 'n−1' Vsynch slots of upper threshold or by falling in the last, 'nth' Vsynch slot of the upper threshold. If the element had passed TSM by falling in the lower n−1 Vsynch slots, then the video decoder should hold on to the picture, since, in the next Vsync, both TSM and parity will pass for the same picture. On the other hand, if the element had passed TSM by falling in the last 'nth' slot, then that element has to be dropped, since, even though, in the next Vsynch the element will pass parity, TSM will fail (It is being considered for display in a window just outside the n-Vsynch slot it will pass TSM). By having the upper threshold value to 2 Vsyncs (here n=2) and differentiating by checking whether a TSM pass happened in first (lower, n−1) slot or second (upper, nth) slot (when TSM pass, parity fail occurs), will avoid the deadlock along with no compromise on accuracy of A/V sync.

Accordingly:

Display the element and don't release its buffer, so that it could be re-displayed in the next Vsync, if the element had passed TSM by falling in the FIRST_VSYNC_SLOT of the two Vsynch slots of upper threshold.

Discard the element and consider the next element if the element had passed TSM by falling in the SECOND_VSYNC_SLOT of the two Vsynch slots of upper threshold.

A picture is qualified for display if:

The picture passes TSM; and

The picture passes parity check.

Note that there could be scenarios where "deliberately" a picture whose polarity doesn't match the current Vsync's polarity, will have to be displayed. Under these scenarios, the parity check is waived. For example, a picture may have to be re-displayed/repeated depending on the repeat_first_field and the top_field_first flags as directed by the MPEG stream. Depending on the values of source picture (frame) rate and display picture (frame) rate, a picture may have to be repeated/re-displayed over multiple Vsyncs or may have to be dropped. If source picture (frame) rate <display picture (frame) rate, then repeats have to be resorted to and source picture (frame) rate >display picture (frame) rate, then some pictures may have to be dropped. Typically, when repeats happen the parity check result may have to be waived.

At the Vsynch time, if the display queue is empty, the display 250 continues with the same field/frame that was displayed in the previous Vsync. If the next displayable entry is not mature for display, based on host options, the display manager 245 can either causes the display 250 to repeat the previous Field or Frame, or "Pre" display the next immature entry, without actually "popping" it off the FIFO queue 240. The foregoing can be determined by a user controllable control bit, now referred to as the TSMWait.CTOS bit.

The course of actions for the different TSM and parity results are described in TABLE 2.

TABLE 2

| Course of Actions, where Display is Interlaced | | |
|---|---|---|
| TSM | Parity | Course of action |
| Pass | Pass | Display the current element. |
| Pass | Fail | Consider next element. (Next element = either the "other" field of this same frame entry, if this entry has been frame coded and just now considered the "first of the two fields of the frame" or the next entry in the FIFO if this entry is a field or just now considered the "second field" of a frame). |
| Fail | Either | Consider next element. (Next element = either the "other" field of this same frame entry, if this entry has been frame coded and just now considered the "first of the two fields of the frame" or the next entry in the FIFO if this entry is a field or just now considered the "second field" of a frame). |
| Wait | Pass | Decide between redisplaying the element that was displayed in previous Vsynch and displaying the just considered element. Check TSMWait.CTOS bit. |

TABLE 2-continued

Course of Actions, where Display is Interlaced

| TSM | Parity | Course of action |
|---|---|---|
| Wait | Fail | Decide between redisplaying the element that was displayed in previous Vsynch and displaying the just considered element. Check TSMWait.CTOS bit. |

TSM:
Pass - SCR within Upper Threshold or Lower Threshold
Wait - SCR within Discard Threshold, Discard Threshold Enabled
Fail - SCR outside of Upper Threshold, Lower Threshold, and Discard Threshold, or within Discard Threshold with Discard Threshold Disabled Exemplary Values for various TSM related parameters
The host programs the LowerThreshold, UpperThreshold, AV_Offset and Delta_PTS (ΔPTS):

| S. No. | Frame rate | Progressive_sequence (0/1) | Delta PTS value (in Hex) | Lower threshold (in Hex) | Upper threshold (in Hex) | Discard Threshold (in Hex) |
|---|---|---|---|---|---|---|
| 1 | 23.976 | 0 (Forbidden) | | | | |
| 2 | 23.976 | 1 | 0x754 | 0x000 | 0x754 | 0x21E48 |
| 3 | 24 | 0 (Forbidden) | | | | |
| 4 | 24 | 1 | 0x753 | 0x000 | 0x753 | 0x20F58 |
| 5 | 25 | 0 (Forbidden) | | | | |
| 6 | 25 | 1 | 0x708 | 0x000 | 0x708 | 0x20F58 |
| 7 | 29.97 | 0 | 0x2EE | 0x000 | 0x5DC | 0x104BE |
| 8 | 29.97 | 1 | 0x5DD | 0x000 | 0x5DD | 0x104BE |
| 9 | 30 | 0 | 0x2EE | 0x000 | 0x5DC | 0x20F58 |
| 10 | 30 | 1 | 0x5DC | 0x000 | 0x5DC | 0x20F58 |
| 11 | 50 | 0 | 0x1C2 | 0x000 | 0x384 | 0x20F58 |
| 12 | 50 | 1 | 0x384 | 0x000 | 0x384 | 0x20F58 |
| 13 | 59.94 | 0 (Forbidden) | | | | |
| 14 | 59.94 | 1 | 0x2EE | 0x000 | 0x2EE | 0x20C6A |
| 15 | 60 | 0 (Forbidden) | | | | |
| 16 | 60 | 1 | 0x2EE | 0x000 | 0x2EE | 0x20F58 |

Delta PTS and threshold values (Upper, lower and discard) can be based on the source "frame rate". The foregoing describes how to calculate these values.
  If progressive_sequence=1, then the delta PTS value is = (1/n)*45,000, where n is the frames per second. For e.g. if n=24 frames per second and if progressive_sequence=1 (which will be the case if it is ATSC complaint stream), then the delta PTS value=(1/24)*45 K=1875=0x753.
  If progressive_sequence=0, then the delta PTS value is = (1/(2*n))*45,000, where n is the frames per second. For e.g. if n=30 frames per second and if progressive_sequence=0, then the delta PTS value=(1/(2*30))*45 K=750=0x2EE.
  For calculating delta PTS value, for frame rates of 23.96, 29.97 and 59.94 the frequency of the clock is assumed to be 45,000*1.001 and 45,000 (45 Khz) clock and the frame_rate is mapped to 24, 30 and 60 respectively.
  Always, Discard threshold=3 seconds worth=>3*frame_rate*delta_PTS (if progressive_sequence=1) and 3*2*frame_rate*delta_PTS (if progressive_sequence=0).
  Always LowerThreshold=0.
  Always upper threshold=2 Vsynch worth=>delta_PTS value if progressive_sequence=1 and 2*delta_PTS if progressive_sequence=0.
TSM for DirecTV
The different stream types and the frequencies at which the PCR and PTS run are given in the table below:

| Stream Type | PCR | PTS |
|---|---|---|
| MPEG | @45 kHz | @45 kHz |
| DirecTV PES | @27 MHz | @45 kHz |
| DirecTV ES | @27 MHz | @27 MHz |

In the case of DirecTV PES, the PTS comes in the stream is multiplied by 600 before comparing with the PCR. Where as in DirecTV ES, because both PCR and PTS are in 27 MHz, there is no need for multiplication. In the case of DirecTV, as far as Display manager is concerned, it sees PTS in both ES and PES in 27 MHz clock. Because of that the delta PTS also has to be in the same clock. That means the Delta PTS for DirecTV is 600 times that of MPEG irrespective of whether it is ES or PES.
MPEG
  Source clock runs at 27 MHz
  The STC (System Time Clock) is driven by MOD 300 of 27 MHz=>it is driven at resultant clock of 90 kHz.
  This 90 kHz ticks the 33 bit counter called PCR. We take the upper 32 bit for our computation of Time stamp management so the net clock @ which the PCR is driven is @ 45 kHz
DirecTV ES
  The STC is driven @ 27 MHz. This clock drives the 32 bit counter.
  The PTS is also counted @ 27 MHz
In DirecTV PES
  The STC is driven @ 27 MHz. This clock drives the 32 bit counter.
  But the PTS run @ 45 kHz. So the PTS has to be multiplied by 600 before comparing with the PCR.
  The embodiments described herein may be implemented as a board level product, as a single chip, application specific integrated circuit (ASIC), or with varying levels of the decoder system integrated with other portions of the system as separate components. The degree of integration of the decoder system will primarily be determined by the speed and cost considerations. Because of the sophisticated nature of modern processor, it is possible to utilize a commercially available processor, which may be implemented external to an ASIC implementation. Alternatively, if the processor is available as an ASIC core or logic block, then the commercially available processor can be implemented as part of an ASIC device wherein certain functions can be implemented in firmware.

Figure 6:
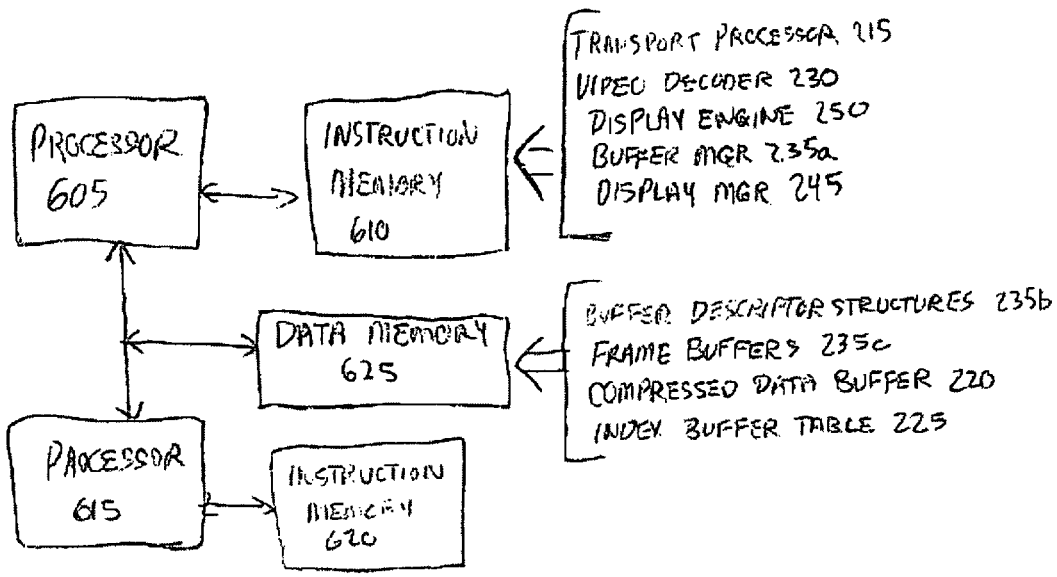
FIG. 6 is a block diagram describing an exemplary circuit in accordance with an embodiment of the present invention.

Referring now to FIG. 6, there is illustrated a block diagram describing an exemplary circuit in accordance with an embodiment of the present invention. The circuit comprises a first processor 605, a first instruction memory 610, a second processor 615, a second instruction memory 620. The circuit also includes data memory 625. The transport processor 215, the video decoder 230, the display engine 250, the buffer manager 235a, and the display manager 245 can be implemented as set of instructions resident in the first instruction memory 610 for execution by the first processor 605. As noted above, the display manager is invoked responsive to the Vsynch. Accordingly, in one embodiment, the display manager can be incorporated into an interrupt handler for the interrupt caused by the Vsynch. The second processor 615 can serve as a host processor, wherein the second processor 615 and as the master processor for the first processor 605, serving as the slave processor.

The FIFO queue 240 can be implemented in a programming interface between the buffer manager and the display manager. The buffer descriptor structures 235b, the frame buffers 235c, the compressed data buffer 220, the index buffer table 225, and the presentation buffer 210 can each form portions of the data memory 625.

Figure 7:
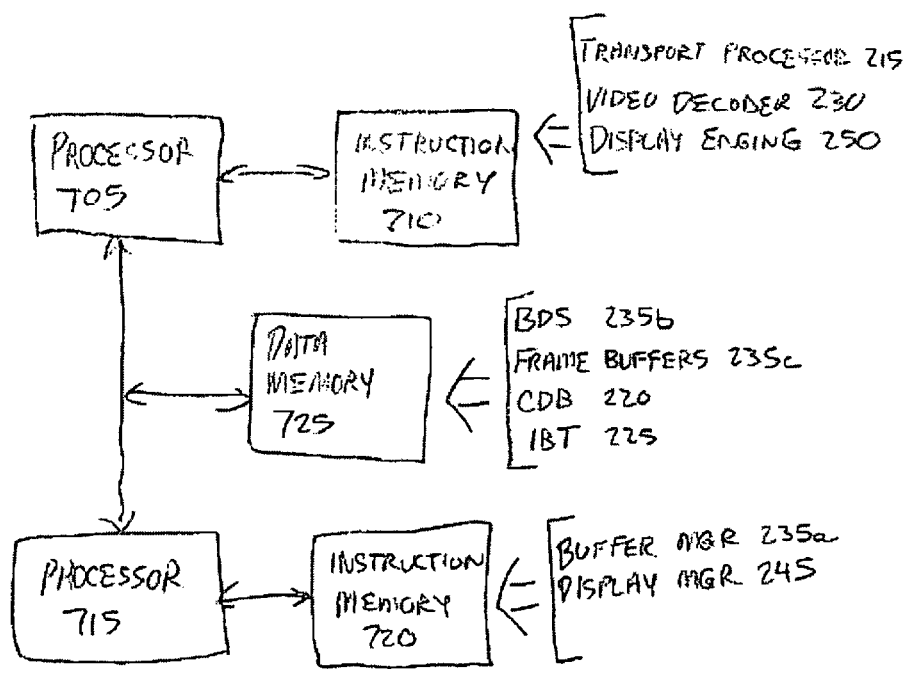
FIG. 7 is a block diagram describing another exemplary circuit in accordance with another embodiment of the present invention.

Referring now to FIG. 7, there is illustrated a block diagram describing an exemplary circuit in accordance with an embodiment of the present invention. The circuit comprises a first processor 705, a first instruction memory 710, a second processor 715, a second instruction memory 720. The circuit also includes data memory 725. The transport processor 215, the video decoder 230, and the display engine 255, can be implemented as a set of instructions resident in the first instruction memory 710 for execution by the first processor 705. The display manager 245 and the buffer manager 235a can be implemented as a set of instructions resident in the second instruction memory 710 for execution by the second processor 715.

As noted above, the display manager is invoked responsive to the Vsynch. Accordingly, in one embodiment, the display manager can be incorporated into an interrupt handler for the interrupt caused by the Vsynch. The second processor 715 can serve as a host processor, wherein the second processor 715 and as the master processor for the first processor 705, serving as the slave processor.

The FIFO queue 240 can be implemented in a programming interface between the buffer manager and the display manager. The buffer descriptor structures 235b, the frame buffers 235c, the compressed data buffer 220, the index buffer table 225, and the presentation buffer 210 can each form portions of the data memory 725.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A method for displaying pictures, said method comprising:
   receiving an identifier, said identifier associated with a frame buffer storing a decoded picture at a circuit;
   extracting a presentation time stamp associated with the decoded picture, responsive to receiving the identifier;
   comparing a local time clock value to the presentation time stamp associated with the decoded picture; and
   determining to hold the picture in the frame buffer if the presentation time stamp exceeds the local time clock value by more than a first predetermined threshold but less than a second predetermined threshold; and
   responsive to the determination, holding the decoded picture in the frame buffer.

2. The method of claim 1, wherein extracting the presentation time stamp associated with the decoded picture further comprises:
   interpolating the presentation time stamp for the decoded picture if the decoded picture does not comprise a presentation time stamp.

3. The method of claim 1, further comprising:
   comparing a subsequent local time clock value to the presentation time stamp associated with the decoded picture;
   determining that the picture has become mature for presentation if (i) the presentation time stamp exceeds the subsequent local time clock value by less than the first predetermined threshold, or (ii) the subsequent local time clock value exceeds the presentation time stamp by less than a third predetermined threshold; and
   providing the picture for displaying if the picture is determined to be mature for presentation.

4. The method of claim 1, further comprising:
   comparing a subsequent local time clock value to the presentation time stamp associated with the decoded picture;
   determining that the picture has become mature for presentation if (i) the presentation time stamp exceeds the subsequent local time clock value by less than the first predetermined threshold, or (ii) the subsequent local time clock value exceeds the presentation time stamp by less than a third predetermined threshold; and
   providing the picture for displaying based on the polarity of the picture and responsive to the determination that the picture is mature for presentation.

5. The method of claim 1, further comprising:
   receiving a second identifier, said second identifier associated with the frame buffer storing a decoded second picture;
   extracting a second presentation time stamp associated with the decoded second picture, responsive to receiving the second identifier;
   comparing a second local time clock value to the second presentation time stamp associated with the decoded second picture; and
   disqualifying the second picture if (i) the second presentation time stamp exceeds the second local time clock value by more than the second threshold and the second threshold is enabled, or (ii) the second presentation time stamp exceeds the second local time clock value by more than the first predetermined threshold and the second threshold is disabled.

6. The method of claim 1, wherein the second predetermined threshold comprises a discard threshold.

7. The method of claim 1, further comprising:
providing the picture for displaying if the presentation time stamp exceeds the local time clock value by more than the first predetermined threshold and by less than the second predetermined threshold, a user settable control parameter is in a first state; and
providing a previously displayed picture for displaying, if the presentation time stamp exceeds the local time clock value by more than the first predetermined threshold and by less than the second predetermined threshold, if the user settable control parameter is in a second state.

8. A system for displaying frames, said system comprising:
a buffer manager configured for providing an identifier, said identifier associated with a frame buffer storing a decoded picture;
a buffer descriptor structure for storing a presentation time stamp associated with the decoded picture; and
a display manager configured for:
comparing a local time clock value to the presentation time stamp associated with the decoded picture,
determining to hold the picture in the frame buffer if the presentation time stamp exceeds the local time clock value by more than a first predetermined threshold but less than a second predetermined threshold, and
responsive to the determination, holding the decoded picture in the frame buffer.

9. The system of claim 8, wherein the display manager comprises a presentation time stamp register for interpolating the presentation time stamp for the decoded picture if the picture does not comprise a presentation time stamp.

10. The system of claim 8, further comprising:
a display engine configured for providing the picture for displaying if the picture is determined to be mature for presentation; and
wherein the display manager is further configured for:
comparing a subsequent local time clock value to the presentation time stamp associated with the decoded picture, and
determining that the picture has become mature for presentation if (i) the presentation time stamp exceeds the subsequent local time clock value by less than the first predetermined threshold, or (ii) the subsequent local time clock value exceeds the presentation time stamp by less than a third predetermined threshold.

11. The system of claim 8, further comprising:
a display engine configured for providing the picture for displaying based on the polarity of the picture and a determination that the picture is mature for presentation; and
wherein the display manager is further configured for:
comparing a subsequent local time clock value to the presentation time stamp associated with the decoded picture, and
determining that the picture has become mature for presentation if (i) the presentation time stamp exceeds the subsequent local time clock value by less than the first predetermined threshold, or (ii) the subsequent local time clock value exceeds the presentation time stamp by less than a third predetermined threshold.

12. The system of claim 8, wherein the display manager is further configured to:
compare a second local time clock value to a second presentation time stamp associated with a decoded second picture, said second picture stored in the frame buffer; and
disqualify the second picture if (i) the second presentation time stamp exceeds the second local time clock value by more than the second threshold and the second threshold is enabled or (ii) the second presentation time stamp exceeds the second local time clock value by more than the first predetermined threshold and the second threshold is disabled.

13. The system of claim 8, wherein the second predetermined threshold comprises a discard threshold.

14. The system of claim 8, wherein the display engine is further configured for:
providing the picture for displaying if the presentation time stamp exceeds the local time clock value by more than the first predetermined threshold and by less than the second predetermined threshold, if a user settable control parameter is in a first state; and
providing a previously displayed picture for displaying, if the presentation time stamp exceeds the local time clock value by more than the first predetermined threshold and by less than the second predetermined threshold, if the user settable control parameter is in a second state.

15. A circuit for displaying pictures, said circuit comprising:
a processor;
an instruction memory connected to the processor, the instruction memory storing a plurality of instructions, wherein execution of the plurality of instructions by the processor causes the circuit to:
receive an identifier, said identifier associated with a frame buffer storing a decoded picture;
extract a presentation time stamp associated with the decoded picture, responsive to receiving the identifier;
compare a local time clock value to the presentation time stamp associated with the decoded picture;
determine to hold the picture in the frame buffer if the presentation time stamp exceeds the local time clock value by more than a first predetermined threshold but less than a second predetermined threshold; and
responsive to the determination, hold the decoded picture in the frame buffer.

16. The circuit of claim 15, wherein execution of the plurality of instructions also causes the circuit to:
interpolate the presentation time stamp for the decoded picture if the decoded picture does not comprise a presentation time stamp.

17. The circuit of claim 15, wherein execution of the plurality of instructions also causes the circuit to:
compare a subsequent local time clock value to the presentation time stamp associated with the decoded picture;
determine that the picture has become mature for presentation if (i) the presentation time stamp exceeds the subsequent local time clock value by less than the first predetermined threshold, or (ii) the subsequent local time clock value exceeds the presentation time stamp by less than a third predetermined threshold; and
provide the picture for displaying if the picture is determined to be mature for presentation.

18. The circuit of claim 15, wherein execution of the plurality of instructions also causes the circuit to:
compare a subsequent local time clock value to the presentation time stamp associated with the decoded picture;
determine that the picture has become mature for presentation if (i) the presentation time stamp exceeds the subsequent local time clock value by less than the first predetermined threshold, or (ii) the subsequent local time clock value exceeds the presentation time stamp by less than a third predetermined threshold; and provide the picture for displaying based on the polarity of the picture and responsive to the determination that the picture is mature for presentation.

19. The circuit of claim 15, wherein execution of the plurality of instructions also causes the circuit to:
  receive a second identifier, said second identifier associated with the frame buffer storing a decoded second picture;
  extract a second presentation time stamp associated with the decoded second picture, responsive to receiving the second identifier;
  compare a second local time clock value to the second presentation time stamp associated with the decoded second picture; and
  disqualify the second picture if (i) the second presentation time stamp exceeds the second local time clock value by more than the second threshold and the second threshold is enabled or (ii) the second presentation time stamp exceeds the second local time clock value by more than the first predetermined threshold and the second threshold is disabled.

20. The circuit of claim 15, wherein the second predetermined threshold comprises a discard threshold.

21. The circuit of claim 15, wherein execution of the plurality of instructions also causes the circuit to:
  provide the picture for displaying if the presentation time stamp exceeds the local time clock value by more than the first predetermined threshold and by less than the second predetermined threshold, if a user settable control parameter is in a first state; and
  provide a previously displayed picture for displaying, if the presentation time stamp exceeds the local time clock value by more than the first predetermined threshold and by less than the second predetermined threshold, if the user settable control parameter is in a second state.

22. The method of claim 1, wherein the identifier identifies the frame buffer.

23. The method of claim 2, wherein the pictures are displayed in a different order than the pictures are decoded.

24. The method of claim 1, wherein the comparing a local time clock value to the presentation time stamp associated with the picture, further comprises comparing the presentation time stamp associated with the picture after decompressing the picture.

* * * * *

UNITED STATES PATENT AND TRADEMARK OFFICE
CERTIFICATE OF CORRECTION

PATENT NO.        : 8,995,536 B2
APPLICATION NO.   : 10/892897
DATED             : March 31, 2015
INVENTOR(S)       : Mk Subramanian et al.

Page 1 of 1

It is certified that error appears in the above-identified patent and that said Letters Patent is hereby corrected as shown below:

In the claims

Please replace claim 7 in column 17, lines 1-11 with the following corrected version:

7. The method of claim 1, further comprising:
providing the picture for displaying if the presentation time stamp exceeds the local time clock value by more than the first predetermined threshold and by less than the second predetermined threshold, <u>if</u> a user settable control parameter is in a first state; and
providing a previously displayed picture for displaying, if the presentation time stamp exceeds the local time clock value by more than the first predetermined threshold and by less than the second predetermined threshold, if the user settable control parameter is in a second state.

Signed and Sealed this
First Day of December, 2015

Michelle K. Lee
*Director of the United States Patent and Trademark Office*